United States Patent
Nagami et al.

Patent Number: 5,462,905
Date of Patent: Oct. 31, 1995

[54] EXHAUST GAS PURIFYING CATALYST

[75] Inventors: Tetsuo Nagami, Nagoya; Yoshitsugu Ogura; Masahiko Ogai, both of Toyota; Yoshiaki Fukushima, Aichi; Shinji Inagaki, Nagoya; Kazuhiro Fukumoto, Nagoya; Kouji Banno, Nagoya; Yuji Sakakibara, Susono; Yasuo Takada; Takashi Ohta, both of Nagoya; Akane Okada, Oobu; Yukimura Yamada, Ogasa; Kiyotaka Hayashi, Ogasa; Shinji Matsuura, Ogasa; Kazuyuki Kuroda, Nerima, all of Japan

[73] Assignees: Toyota Jidosha Kabushiki Kaisha; Toyota Chuo Kenkyusho Kabushiki Kaisha, both of Aichi, Japan

[21] Appl. No.: 105,932

[22] Filed: Aug. 13, 1993

[30] Foreign Application Priority Data

Aug. 21, 1992 [JP] Japan .................................. 4-222756
Aug. 21, 1992 [JP] Japan .................................. 4-245698

[51] Int. Cl.⁶ .................................................. B01J 21/08
[52] U.S. Cl. ........................ 502/232; 502/240; 502/62; 502/84
[58] Field of Search ............................ 502/232, 240, 502/62, 84

[56] References Cited

U.S. PATENT DOCUMENTS

| | | | |
|---|---|---|---|
| 4,774,213 | 9/1988 | Schneider et al. | |
| 4,985,210 | 1/1991 | Minami | 422/169 |
| 5,063,039 | 11/1991 | Valyocsik | 423/329 |
| 5,078,979 | 1/1992 | Dunne | 423/212 |
| 5,098,684 | 3/1992 | Kresge et al. | |
| 5,102,643 | 4/1992 | Kresge et al. | |

FOREIGN PATENT DOCUMENTS

| | | | |
|---|---|---|---|
| 0284278 | 9/1988 | European Pat. Off. | |
| 0346007 | 6/1989 | European Pat. Off. | |
| 0472144A2 | 8/1991 | European Pat. Off. | |
| 3928760A1 | 3/1990 | Germany | |
| 55-147153 | 11/1980 | Japan | |
| 7004235 | 1/1982 | Japan | 502/240 |
| 62-201648 | 9/1987 | Japan | |
| 64-4220 | 1/1989 | Japan | |
| 64-4020 | 1/1989 | Japan | |
| 1-245850 | 10/1989 | Japan | |
| 2-75327 | 3/1990 | Japan | |
| 2-63552 | 3/1990 | Japan | |
| 3-49658 | 3/1991 | Japan | |
| 4-238810 | 8/1992 | Japan | |
| 2070958 | 9/1981 | United Kingdom | 502/84 |
| 2169274 | 7/1986 | United Kingdom | 502/62 |
| WO88/00091 | 1/1988 | WIPO | |

OTHER PUBLICATIONS

Kenyaite—Synthesis and properties, Beneke et al, American Mineralogist, vol. 68, pp. 818–826, 1983.

*Primary Examiner*—Asok Pal
*Attorney, Agent, or Firm*—Oliff & Berridge

[57] ABSTRACT

An exhaust gas purifying catalyst is characterized in that at least one kind of catalyst metal is loaded on a layered porous silica or a layered porous silica-metal oxide. The exhaust gas purifying catalyst is used as an oxidation catalyst for purifying hydrocarbon and carbon monoxide, or a reduction catalyst for purifying nitrogen oxides ($NO_x$), which is suitable for purifying exhaust gases in automobiles. An exhaust gas purifying apparatus includes the above exhaust gas purifying catalyst and an absorbent for trapping hydrocarbon components, in which aromatic HC such as trimethylbenzene and the like are effectively trapped.

4 Claims, 7 Drawing Sheets

EXHAUST GAS PURIFYING CATALYST

BACKGROUND OF THE INVENTION

1. Field of the Invention

The present invention relates to an exhaust gas purifying catalyst for purifying hydrocarbon, carbon monoxide or nitrogen oxides ($NO_x$) contained in exhaust gases exhausted from an internal combustion engines of automobiles and the like.

2. Description of the Related Art

Conventionally, inorganic porous body such as alumina or zeolite is mainly used as a support of an exhaust gas purifying catalyst for automobiles. Japanese Laid-Open Patent Publication No. 201648/1987 discloses various kinds of supports such as alumina, silica, titania and alumina-silica. Japanese Laid-Open Patent Publication No. 147153/1980 discloses A-type zeolite, X-type zeolite and mordenite-system zeolite. Japanese Laid-Open Patent Publication No. 4220/1989 discloses crystalline zeolite. Japanese Laid-Open Patent Publication No. 63552/1990 discloses composite oxides comprising titanium, nitrogen and ziroconia. Japanese Laid-Open Patent Publication No. 245850/1989 discloses an aggregate comprising ceramic fibers.

The above inorganic porous bodies have wide specific surface, acidity and heat resistance at high temperature, so they are suitable for catalytic supports. These supports are used as conventional exhaust gas purifying catalysts in such a manner that a noble metal such as platinum or rhodium is loaded on these supports.

So-called cold HC is the problem, for it is included in the exhaust gas at low temperature immediately after the engine is ignited and it is hard to be purified by catalysts. To solve this problem, there is proposed an exhaust gas purifying apparatus such as cold HC purifying system and the like which use absorbent such as zeolite for temporarily trapping cold HC (Japanese Patent Laid-Open No. 2-75327/1990 and Japanese Patent Application No. 3-49658/1991).

However, the above-described conventional exhaust gas purifying catalysts have poor catalytic activity. So, they are required to improve catalytic activity in order to purify exhaust gases in diesel engines.

In the case of the above-mentioned exhaust gas purifying apparatus, hydrocarbon components, which are trapped by zeolite as the absorbent, are limited to have relatively small molecules. In this apparatus, it is difficult to efficiently trap bulky aromatic HC such as trimethylbenzene which causes troubles in some countries as the material having the high capacity of forming ozone. This may be related to the small pore diameters for trapping in zeolite.

Zeolite has the low heat resistance, so it is hard to directly be provided in the exhaust gas system of an internal combustion engines. Therefore, zeolite should be provided in the system with a bypass or the like.

As mentioned above, in the conventional evaporated fuel absorbing apparatus and the hydrocarbon trapping apparatus of the exhaust gas purifying apparatus, there are various problems caused by the insufficient specific surfaces of absorbents for trapping hydrocarbon components, small pore diameters for trapping and the low heat resistance.

SUMMARY OF THE INVENTION

It is an object of the present invention to provide an exhaust gas purifying catalyst having excellent catalytic activity which is used as an oxidation catalyst for purifying hydrocarbon and carbon monoxide, or a reduction catalyst for purifying nitrogen oxides ($NO_x$), and which is suitable for purifying exhaust gases in automobiles.

It is another object of the present invention to provide a hydrocarbon trapping apparatus, an evaporated fuel absorbing apparatus and an exhaust gas purifying apparatus without the above-mentioned problems.

Extensive researches have been made for achieving the above objects, and they have invented the following exhaust gas purifying catalyst in which a layered porous silica or a layered porous silica-metal oxide is used as a support.

The exhaust gas purifying catalyst according to the present invention is characterized in that at least one kind of catalyst metal is loaded on a layered porous silica or a layered porous silica-metal oxide.

As shown in the chemical formula 1, the layered porous silica or the layered porous silica-metal oxide has the structure that the skeleton comprises $SiO_2$ or $SiO_2$ metal composite oxide. As shown in FIG. 2, the layered porous silica or the layered porous silica-metal oxide has the basic structure that a plurality of planar sheets 10 are piled up on each other. As shown in FIG. 1, each of these sheets 10 are curved, and one sheet 10 is partially connected to the other sheet 10 to form a three-dimensional skeleton. Among these layers, there are plural of pores 2 whose diameter is in the range of 10 to 60 angstroms.

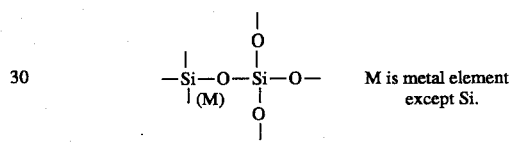

M is metal element except Si.

The layered porous silica is used in the forms of spherical particles, prismatic particles or the like. Considering to secure the gas permeability of its filling part and the contacting area of gas, the dimensions of particles are preferably as follows: the diameter of spherical particle falls in the range of 0.1 to 10 mm; the diameter of prismatic particle falls in the range of 0.1 to 5 mm and the length of prismatic particle falls in the range of 1 to 30 mm. The layered porous silica may also be used by being loaded on a support comprising appropriate material and having a certain configuration (such as an opening three dimensions ped).

The specific surface of the above layered porous silica is in the range of 600 to 1500 $m^2/g$. As shown in FIG. 1, the exhaust gas purifying catalyst according to the present invention has the structure that a fine particle of catalyst metal 3 is loaded on the inner portion of the pore 2 of a layered porous silica 1 or a layered porous silica-metal oxide 1.

The loaded amount of the catalyst metal is desirably not less than 0.03% by weight against the layered porous silica. When the loaded amount of the catalyst metal is less than 0.03% by weight, no catalytic action occurs.

The catalyst metals include noble metals, transition metals and rare earth metals. Among these, noble metals are preferable. Especially, platinum is the most preferable. Since the layered porous silica and platinum or the layered porous silica-metal oxide and platinum show high affinity, platinum is widely dispersed and loaded. Furthermore, sintering of platinum particles at high temperature is prevented.

The layered porous silica is manufactured by the following manner. At first, crystalline layered silicate such as kanemite is heated and agitated in alkyl trimethyl ammonium aqueous solution to generate a layered crystal. Then, an organic substance is introduced into the layers of the layered crystal by means of ion exchange reaction to form an interlayered bridge of $SiO_2$. This is referred to as an interlayered extension process. After that, the above layered crystal is filtered, dried and calcined at the temperature of 700° C. to obtain the layered porous silica.

The layered porous silica-metal oxide is manufactured by the following manner. At first, crystalline layered silicate is heated and agitated in alkyl trimethyl ammonium aqueous solution. Then, it is filtered and contacted with metallic salt other than silicon. This is referred to as a metal addition process. After that, it is calcined at high temperature to obtain the layered porous silica-metal oxide.

Crystalline layered silicate for forming a layered porous silica is represented by crystalline layered sodium silicate containing sodium ion between silicon tetrahedral layers. Crystalline layered sodium silicate include kanemite ($NaHSi_2O_5 \cdot 3H_2O$), sodium subsilicate ($Na_2Si_2O_5$), macatite ($Na_2Si_{14}O_5 \cdot 5H_2O$), airaite ($Na_2Si_8O_{17} \cdot xH_2O$), magadiite ($Na_2Si_{14}O_{23} \cdot xH_2O$), kenyaite ($Na_2Si_{20}O_{41} \cdot xH_2O$) and so on. However, crystalline layered sodium silicate is not limited to the above substance.

Since the above crystalline layered silicate contains no structural water, it is different from clay mineral. Hydroxyl group of silanols is used for forming interlayered bridge formation of $SiO_2$ by means of condensation in the interlayered extension process. So, the pore structure of the crystalline layered silicate is not deteriorated at high temperature. Concerning kanemite which is one kind of crystalline layered silicate, layered crystal comprises single silicon tetrahedral layer, so the surface area per unit weight is wide, and the monolayer structure cannot be deteriorated under the calcination treatment at high temeprature. When the layered porous silica or the layered porous silica-metal oxide is formed by using kanemite, the specific area becomes wide, and catalytic ability improves. When kanemite is used for forming the layered porous silica or the layered porous silica-metal oxide, the upper layer is partially connected with the lower layer while maintaining the monolayer structure, and the non-connected portion has pores comprising organic substance. Namely, the layered porous silica or the layered porous silica-metal oxide has porous structure having honey-comb shaped cross section.

The above pore diameter is depended on the size of organic substance which is used in the process for forming the layered porous silica or the layered porous silica-metal oxide. However, when the pore diameter is less than 10 angstroms which is the same size of zeolite, it has no effect on the forming. The maximum of the pore diameter is not limited. However, when the pore diameter is more than 100 angstroms, the corresponding organic substance is a few, and validity is less. The distribution of the pore diameter can be within the uniformly narrow ranges, and it can be within the wide ranges of 10 to 40 angstroms.

Interlayered bridge formation of $SiO_2$ is formed in such a manner that concentration occurs between two hydroxyl groups which are connected to silicon of two silicon tetrahedral layers opposed each other in the interlayered extension process.

The layered porous silica-metal oxide has acidity. The acidity is generated when metallic atom is connected to a part of silicon which constitutes the silicon tetrahedral layer by way of oxygen. Therefore, the acidity functions as Lewis acid. Furthermore, the acidity functions as Bronsted acid when water is added to the acidity to discharge proton. In both cases, the acidity exhibits catalytic activity.

Metallic atoms which has the acidity include aluminum, zirconium, gallium, beryllium, magnesium, yttrium, lanthanum, tin, lead and the like.

The structural analysis of the layered porous silica are shown as follows. Concerning one sample in which cetyl trimethyl ammonium chloride is used as an organic substance, the peak corresponding to 38 angstroms is observed by powder X-ray diffraction (See FIG. 3). Since the peak corresponds to the layer distance, the layered porous silica has the layered structure having the layer space of 38 angstroms.

Concerning $^{29}Si$—MAS·NMR, kanemite which is used as raw material shows the peak corresponding to $Q_3$ of Si (representing the condition that one of four oxygen atoms is free). On the other hand, the layered porous silica shows the peak corresponding to $Q_4$ of Si (representing the condition that none of four oxygen atoms is free) (See FIG. 4). As shown in FIG. 4, while kanemite has no layer bonding, the layered porous silica has layer bonding and three-dimensional network.

When the distribution of the pore diameter of the layered porous silica is shown by the measurement of nitrogen adsorption isotherm, the distribution is within the narrow ranges around 30 angstroms (See FIG. 5).

The method for forming the layered porous silica or the layered porous silica-metal oxide is described as follows. The organic substance is introduced into silicon tetrahedral layers in the interlayered extension process, and cation of organic substance reacts with sodium ion to make ion exchange reaction. Since crystalline layered sodium silicate such as kanemite has no lubricating ability with water, it is different from clay mineral and it is hard to cause interlayered extension. However, it is possible to make interlayered extension by means of introducing organic substance for ion exchange reaction.

There is no limit to kinds of cation of organic substance. But, organic onium ion, especially, alkyl ammonium ion is preferable since it is excellent in easy sample preparation and ion exchanging ability. Molecular size and molecular weight of the organic substance directly regulate the degree of interlayered extension, namely, the pore diameter of the layered porous silica or the layered porous silica-metal oxide. So, the pore diameter is freely decided by optimum selection of molecular size and molecular weight.

Concerning the distribution of the pore diameter, it can be set within uniformly narrow ranges when single kind of organic substance is used. When plenty kinds of organic substances having different molecular size and different molecular weight are used together, the distribution of the pore diameter can be set within wide ranges.

There is also no limit to kinds and usage of metallic salt in the metal addition process. The layered crystal of $SiO_4$ tetrahedra can be immersed into the metallic salt solution, and the powder of the layered crystal of $SiO_4$ tetrahedra can be mixed and contacted with the powder of the metallic salt. When the metallic salt solution is used, it is preferable that the layered crystal of $SiO_4$ tetrahedra is dried after immersing in order to improve the efficiency of the calcination process.

In the calcination process, it is desirable that calcination is normally performed at the temperature of 500° to 800° C. for hours. When the calcination temperature is too high, the structure of the layered porous silica is likely to be deteriorated. On the other hand, when the calcination temperature is too low, the structure of the layered porous silica is not fully fixed. There is no limit to calcination condition, so the layered porous silica can be calcined in the air. Furthermore, it also can be calcined in the atmosphere including oxygen or ozone in order to improve decomposition of organic substance.

The catalyst metal such as platinum is loaded on the above layered porous silica or the above layered porous silica-metal oxide. The method for loading the catalyst metal is performed in such a manner that the layered porous silica or the layered porous silica-metal oxide is immersed into the solution of the catalyst metal compound to vaporize moisture, and to be calcined, for example, at the temperature of 350° C.

An exhaust gas purifying apparatus according to the present invention is provided in an exhaust system of an internal combustion engine, and it comprises an installation portion of an exhaust gas purifying catalyst and an installation portion of absorbent for trapping hydrocarbon components.

The above-described layered porous silica or the above-described layered porous silica-metal oxide is used as the absorbent.

The above-mentioned internal combustion engine may be represented by a gasoline engine or diesel engine, but it is not limited to these engines. The exhaust gas system of internal combustion engine indicates totally from an exhaust manifold to the tip of an exhaust port of an exhaust pipe. The portion of providing exhaust gas purifying apparatus is not limited. Exhaust gas purifying catalyst should at least be the catalyst which has the activity for purifying HC in exhaust gas. So, for example, so called oxidation catalyst or three way catalyst is used as exhaust gas purifying catalyst. The kind and use of the catalyst or the kind of activated metal which is loaded by the catalyst are not limited. Activated metal may be selected from Pt (platinum), Pd (palladium), Pt—Pd, Pt—Rh (rhodium), Pd—Ph, Pt—$V_2O_5$ (vanadium oxide) and the like.

The arrangements of the providing portion of absorbent in the exhaust system and the providing portion of the exhaust gas purifying catalyst reside in the following two patterns. In one pattern, the former is provided at the upstream side and in the other pattern, the latter is provided at the upstream and the downstream side of the former (refer to FIGS. 8 to 10). The providing portion of absorbent can reside in the exhaust system or also can reside in the bypass provided in the exhaust system.

The absorbent is at least one of the above-mentioned layered porous silica and layered porous silica-metal oxide. Both of the above-mentioned layered porous silica may be combined to be used as the absorbent or other kinds of absorbents having a high heat resistance may also be used together. The use of these absorbents is not limited but the examples include a pellet form and the form in which they are coated on support such as cordierire, metal honeycomb and the like.

The specific surface of the layered porous silica or the layered porous silica-metal oxide is 2 to 7.5 times as large as the conventional catalyst support such as alumina (having the specific surface of 200 to 300 $m^2/g$). So, it is possible to load much amount of catalyst metal high-dispersively. Concerning catalytic reaction, the more the active spot is, the faster the reaction speed is, and the higher the activity is. Therefore, when the catalyst metal which functions as active spot is highly dispersed, the number of active spot increases and the activity becomes high.

The exhaust gas purifying catalyst according to the present invention has plenty of fine pores being 10 to 60 angstroms on its support. Since the pore diameter is slightly larger than the particle diameter of hydrocarbon (being 5 to 15 angstroms), hydrocarbon having low concentration in exhaust gases can be effectively trapped to be contacted with oxygen or $NO_x$. The conventional layered porous silica such as zeolite has small pore diameter being less than 10 angstroms, so hydrocarbon cannot be trapped. Or even if hydrocarbon can be trapped, catalytic activity cannot be fully generated since hydrocarbon cannot be dispersed into the inner side of the pore. However, in the catalyst according to the present invention, the pore diameter is enough large for hydrocarbon to be dispersed into the inner side of the pore to be effectively reacted on the catalyst metal.

In the exhaust gas purifying catalyst according to the present invention, since particles of catalyst metal loaded on the inner side of multiple of pores are encircled with pore wall, sintering is not likely to occur, and excellent heat resistance can be obtained.

For a few minutes immediately after the ignition of the internal combustion engine, so called cold HC including unburned gasoline vapor is generated. On the other hand, the catalyst is in the state being not warmed up yet, so the ability for purifying exhaust gas is not sufficiently exercised. Accordingly, cold HC is hardly purified.

The above-mentioned cold HC is absorbed and stocked by the layered porous silica or the layered porous silica-metal oxide as the absorbent, so the cold HC is not exhausted in the atmosphere.

Aromatic HC such as trimethylbenzene and the like which are not effectively trapped by the conventional zeolite and the like can be smoothly trapped.

After that, the condition in which the exhausting temperature rises and the ability of the catalyst for purifying HC is obtained, the HC which was absorbed and stocked by the above-mentioned absorbent is purged as the temperature rises and purified by the above-mentioned catalyst.

The absorbent is in superior in heat resistance so it is not necessarily provided in bypass and also can be provided at the high temperature portion (for example, the most upstream portion) of the exhaust gas system. Namely, the providing portion is selected more freely.

In the exhaust gas purifying catalyst according to the present invention, the catalyst metal is high-dispersively loaded on the wide surface area of the support. Furthermore, since the exhaust gas purifying catalyst has plenty of pores having the appropriate diameter, hydrocarbon can be effectively trapped. Therefore, hydrocarbon can be reacted with oxygen or $NO_x$ at low temperature so that the exhaust gas purifying catalyst shows excellent catalytic activity.

Furthermore, in the exhaust gas purifying catalyst, particles of catalyst metal which are highly dispersed are encircled with pore wall, so the catalytic activity can be maintained at high temperature without sintering, and the catalyst has excellent heat resistance.

The exhaust gas purifying catalyst according to the present invention can be used as an oxidation catalyst in which hydrocarbon, soluble organic fraction (BOF) and carbon monoxide contained in exhaust gases in diesel engines can be oxidized at low temperature, a catalyst for purifying $NO_x$ in which $NO_x$ contained in exhaust gases in diesel engines can be selectively reduced by hydrocarbon having low concentration, and a catalyst for purifying $NO_x$ by which $NO_x$ can be selectively reduced by hydrocarbon having low concentration in the oxidation atmosphere in lean-burn engines in order to improve fuel consumption.

In the exhaust gas purifying apparatus according to the present invention, so called cold HC are effectively purified. Especially aromatic HC such as trimethylbenzene and the like are effectively trapped. Also the absorbent is superior in heat resistance so the deterioration owing to heat is little and the providing portion can be selected more freely.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
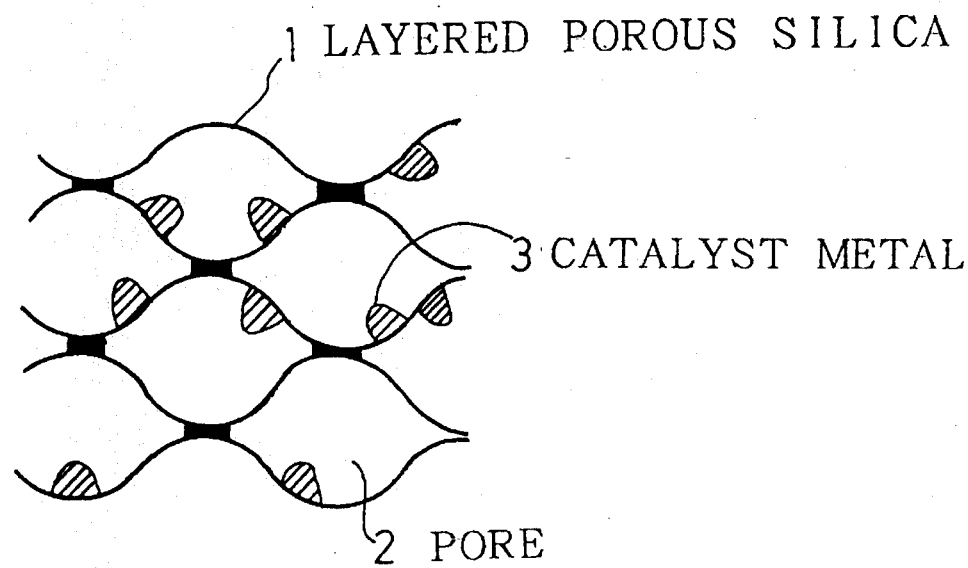
FIG. 1 is an enlarged view for showing the main portion of the exhaust gas purifying catalyst according to the present invention.
Figure 2:
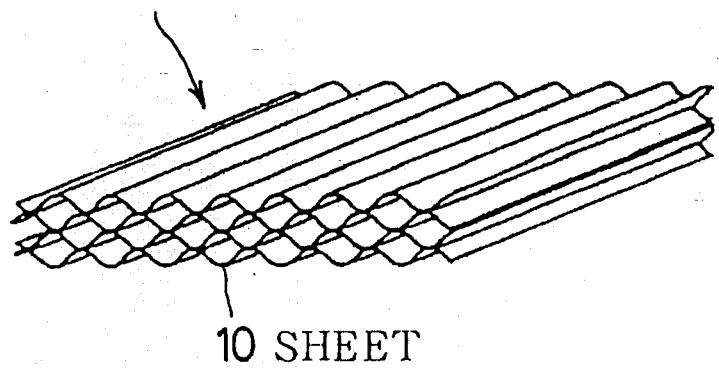
FIG. 2 is a view for showing the layered porous silica which is used as the exhaust gas purifying catalyst.
Figure 3:
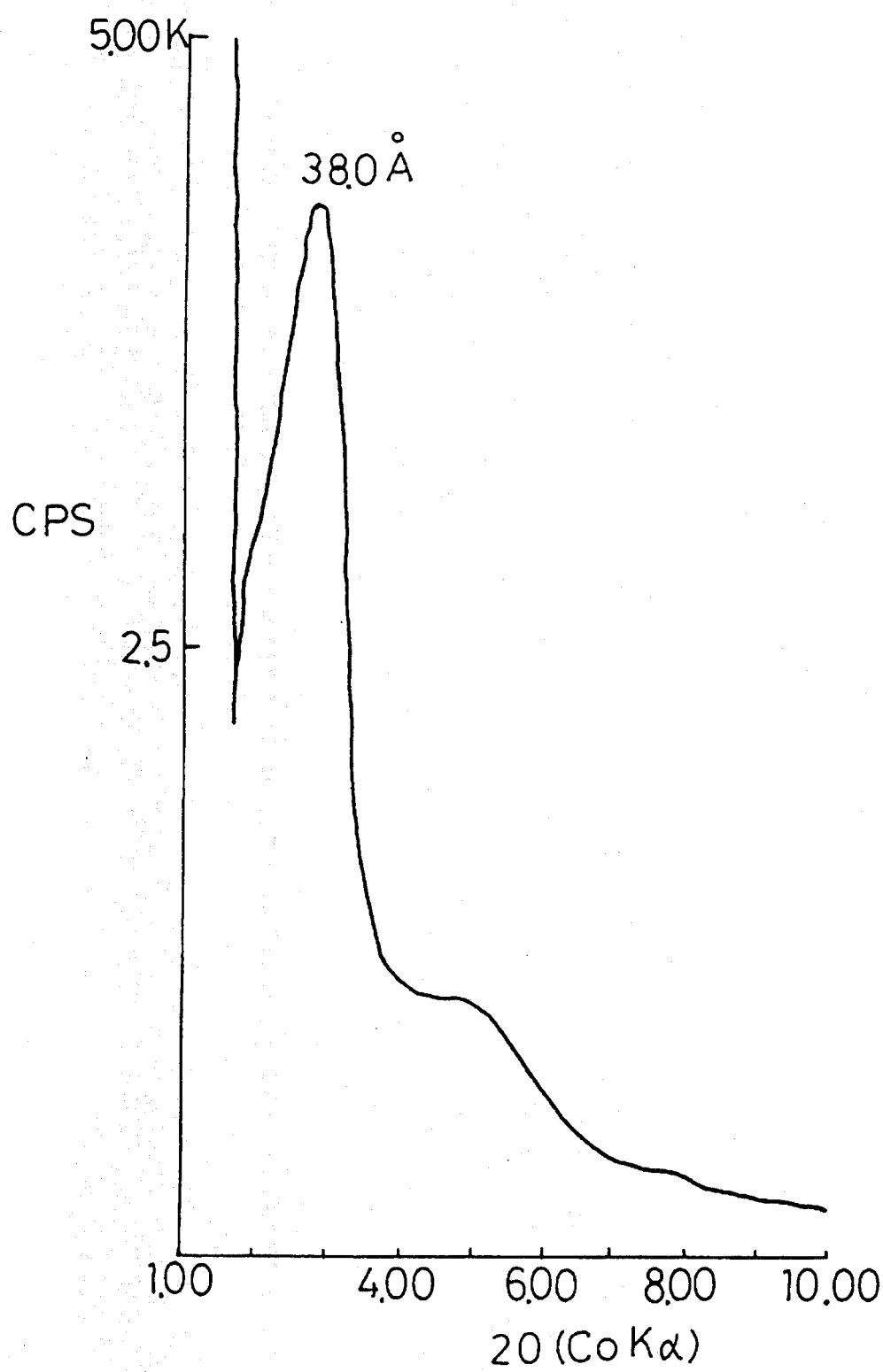
FIG. 3 is a graph for showing the result of the powder X-ray diffraction of the layered porous silica.
Figure 4A:
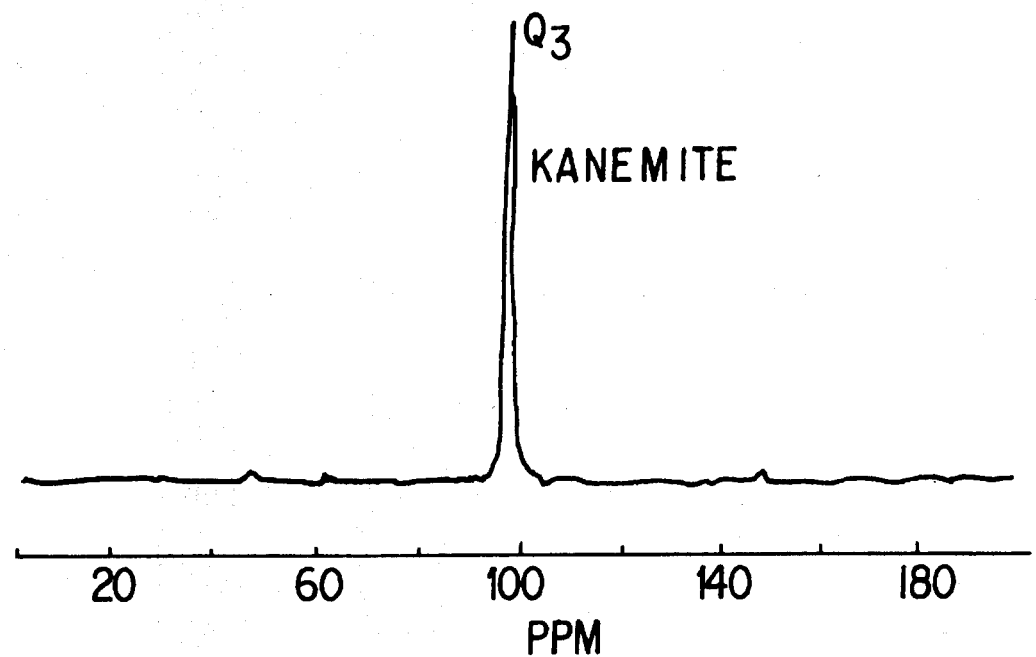
FIG. 4 is a graph for showing the result of the measurement of $^{29}$Si—MAS·NMR of the layered porous silica.
Figure 4B:
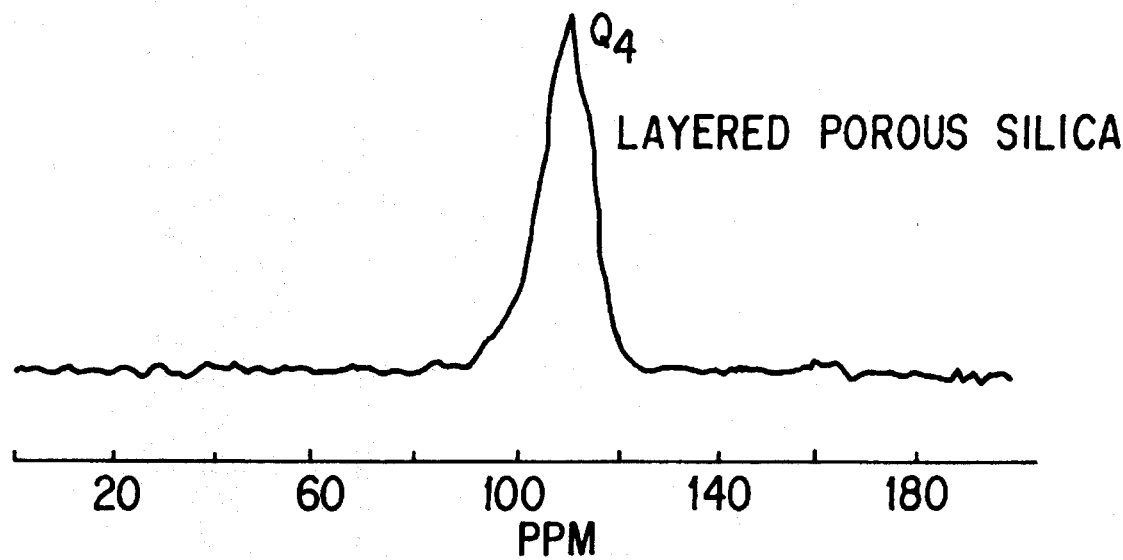
Figure 5:
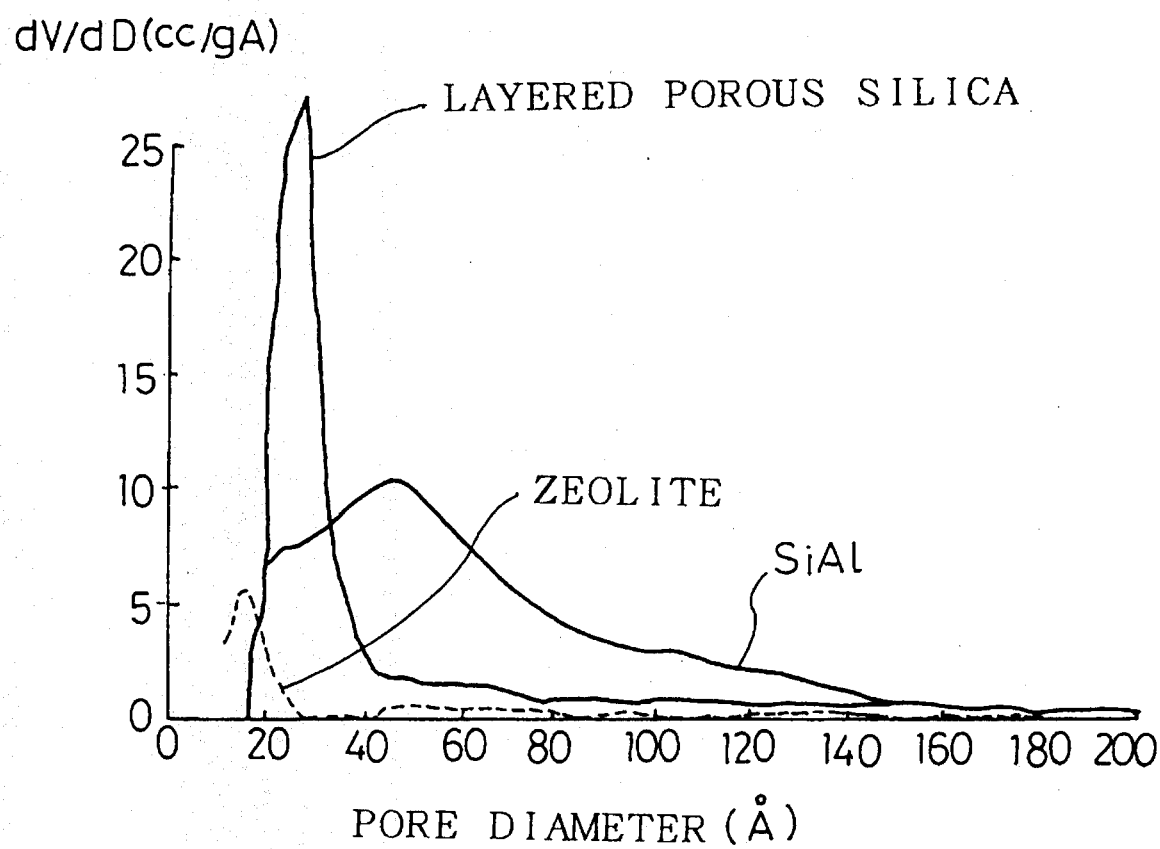
FIG. 5 is a graph for showing the measurement of the distribution of pores in the layered porous silica, zeolite (ZSM-5) and amorphous silica-alumina (JRC-SAL2).

Having generally described the present invention, a further understanding can be obtained by reference to the specific preferred embodiments which are provided herein for purposes of illustration only and are not intended to limit the scope of the appended claims.

The Preferred Embodiments according to the present invention will be hereinafter described with reference to FIGS. 1 through 9.

First Preferred Embodiment (Formation of a layered porous silica)

3870 g of powder sodium silicate ($SiO_2/Na_2O$=2.00) was calcined at the temperature of 700° C. in an electric furnace for six hours to obtain 3000 g of δ-$Na_2Si_2O_5$ crystal. The whole amount of the obtained crystal was immersed into 30 liters of water, and it was agitated for 3 hours. After that, the solid amount was filtered to obtain kanemite which contains 100 wt % by weight of water.

3000 g (dried amount) of the obtained kanemite was dispersed into 60 liters of 0.1N hexadeoyl trimethyl ammonium chloride aqueous solution, and 2N HCl aqueous solution was added to prepare the solution being 8.5 pH. After that, the prepared solution was agitated for 3 hours at the temperature of 70° C.

Then, the solid amount was filtered, and the remaining substance was washed and filtered with 120 liters of water for five times. The obtained sample was dried, and after that, it was calcined at the temperature of 700° C. for six hours under the air to obtain a layered porous silica.

The specific surface of the above layered porous silica was 1100 $m^2$/g which is measured by the nitrogen adsorption method. The distribution of the pore diameter was also measured by the nitrogen adsorption method to show the result that the distribution of the pore diameter was within the ranges of about 30 angstroms.

(Formation of catalyst loaded with platinum)

The predetermined amount of dinitro diamine platinum (Pt—P salt) was diluted with water, and the predetermined amount of the dried layered porous silica was immersed into the diluted solution. Then, the solution was heated and agitated at the temperature of 100° to 120° C. on a hot stall to vaporize moisture. After that, the obtained sample was dried at the temperature of 100° C. in a drier, and it was calcined at 350° C., thereby obtaining 0.08% by weight of catalyst. The obtained catalyst was molded by powder-pressed molding, and it was formed into the granule having 6 to 10 mesh by pulverized classification.

Second Preferred Embodiment

The Second Preferred Embodiment employed the same compositions as described in the First Preferred Embodiment, thereby obtaining 1.67% by weight of catalyst.

Third Preferred Embodiment

The Third Preferred Embodiment employed the same compositions as described in the First Preferred Embodiment, thereby obtaining 2.50% by weight of catalyst.

Fourth Preferred Embodiment

The Fourth Preferred Embodiment employed the same compositions as described in the First Preferred Embodiment, thereby obtaining 4.17% by weight of catalyst.

Fifth Preferred Embodiment

The Fifth Preferred Embodiment employed the same compositions as described in the First Preferred Embodiment, thereby obtaining 6.73% by weight of catalyst.

Sixth Preferred Embodiment

The Sixth Preferred Embodiment employed the same compositions as described in the First Preferred Embodiment, thereby obtaining 8.33% by weight of catalyst.

Seventh Preferred Embodiment

The Seventh Preferred Embodiment employed the same compositions as described in the First Preferred Embodiment except that tetraamine dihydro platinum was used instead of dinitro diamine platinum (Pt—P salt), thereby obtaining 1.67% by weight of catalyst.

Comparative Example 1

The Comparative Example 1 employed the same compositions as described in the Second Preferred Embodiment except that δ-alumina was used instead of the dried layered porous silica, thereby obtaining 1.67% by weight of catalyst.

Comparative Example 2

The Comparative Example 2 employed the same compositions as described in the Fourth Preferred Embodiment except that δ-alumina was used instead of the dried layered porous silica, thereby obtaining 4.17% by weight of catalyst.

Comparative Example 3

The Comparative Example 3 employed the same compositions as described in the Sixth Preferred Embodiment except that δ-alumina was used instead of the dried layered porous silica, thereby obtaining 8.33% by weight of catalyst.

Comparative Example 4

The Comparative Example 4 employed the same compositions as described in the First Preferred Embodiment, thereby obtaining 0.02% by weight of catalyst.

Comparative Example 5

The Comparative Example 5 employed the same compositions as described in the First Preferred Embodiment, thereby obtaining 0.01% by weight of catalyst.

TABLE 1

|  |  | Loaded Amount (wt %) | Platinum Compound |
|---|---|---|---|
| Embodiments | 1 | 0.08 | dinitro diamine platinum |
|  | 2 | 1.67 | dinitro diamine platinum |
|  | 3 | 2.50 | dinitro diamine platinum |
|  | 4 | 4.17 | dinitro diamine platinum |
|  | 5 | 6.73 | dinitro diamine platinum |
|  | 6 | 8.33 | dinitro diamine platinum |
|  | 7 | 1.67 | tetraamine dihydro platinum |
| Comparative Examples | 1 | 1.67 | dinitro diamine platinum |
|  | 2 | 4.17 | dinitro diamine platinum |
|  | 3 | 8.33 | dinitro diamine platinum |
|  | 4 | 0.02 | dinitro diamine platinum |
|  | 5 | 0.01 | dinitro diamine platinum |

Table 1 shows the loaded amount and the kinds of platinum.

(Evaluation)

7 cc of each catalyst was filled into a reaction tube made of quarts having the diameter of 32 mm (inner diameter being 29 mm). Then, the catalyst was heated to the predetermined temperature, and a model gas containing HC was introduced into the reaction tube. HC concentration in the gas flown out from the reaction tube was measured, and HC invert ratio was calculated by the ratio of HC concentration between outflow gas and inflow gas. After that, each of the catalyst was evaluated at the temperature in which 50% of HC can be inverted. $C_6H_{14}$ and $C_{10}H_{22}$ are used as HC, and the composition of the model gas is shown in Table 2.

TABLE 2

| Composition of $C_6H_{14}$ System Model Gas | | Composition of $C_{10}H_{22}$ System Model Gas | |
|---|---|---|---|
| Kinds | Concentration | Kinds | Concentration |
| $C_6H_{14}$ | 500 ppm | $C_{10}H_{22}$ | 200 ppm |
| $O_2$ | 5% | $O_2$ | 10% |
| $N_2$ | Balance | $N_2$ | Balance |

Table 3 shows the result of oxidation decomposition ability of $C_6H_{14}$ and $C_{10}H_{22}$ about each catalyst. Concerning the catalyst in the Preferred Embodiment 2, it is possible that $C_6H_{14}$ and $C_{10}H_{22}$ can be oxidized and decomposed at lower temperature than that of the catalyst in the Comparative Example 1. Concerning the catalyst in the Preferred Embodiment 4, it is possible that $C_6H_{14}$ and $C_{10}H_{22}$ can be oxidized and decomposed at lower temperature than that of the catalyst in the Comparative Example 2. Concerning the catalyst in the Preferred Embodiment 6, it is possible that $C_6H_{10}$ and $C_{10}H_{22}$ can be oxidized and decomposed at lower temperature than that of the catalyst in the Comparative Example 3. Namely, the catalyst in which platinum is loaded on the layered porous silica has higher catalytic activity as compared with the catalyst in which platinum is loaded on δ-alumina.

TABLE 3

|  |  | Loaded Amount (wt %) | Temperature for inverting 50% of HC (°C.) | |
|---|---|---|---|---|
|  |  |  | $C_6H_{14}$ | $C_{10}H_{22}$ |
| Embodiments | 1 | 0.08 | 238 | 209 |
|  | 2 | 1.67 | 190 | 168 |
|  | 3 | 2.50 | 182 | 146 |
|  | 4 | 4.17 | 146 | 127 |
|  | 5 | 6.73 | 133 | 118 |
|  | 6 | 8.33 | 121 | 112 |
| Comparative Examples | 1 | 1.67 | 208 | 181 |
|  | 2 | 4.17 | 196 | 176 |
|  | 3 | 8.33 | 190 | 168 |
|  | 4 | 0.02 | 368 | 359 |
|  | 5 | 0.01 | more than 500 | |

Concerning the catalysts in the Preferred Embodiments 2, 7 and the Comparative Example 1, ability for purifying $NO_x$ contained in exhaust gases in 2-liter diesel engines was examined. 10 cc of each catalyst was filled with a reaction tube made of stainless steel. After that, a part of exhaust gases in diesel engines was introduced into the reaction tube. Then, the ability for purifying $NO_x$ is evaluated by measuring HC concentration and $NO_x$ concentration in outflow gas and inflow gas. Propylene as a reductant was introduced into the reaction tube, and the concentration of total HC of inflow gas was prepared to be 500 to 5000 ppm (by methane conversion). The concentration of $NO_x$ contained in inflow gas is 250 ppm. The space velocity is about 30000 $h^{-1}$.

Table 4 shows the maximum $NO_x$ purification ratio and the maximum temperature for purifying $NO_x$ when HC concentration is 500, 1000, 3000 and 5000 ppm. Concerning the catalysts in the Preferred Embodiments 2 and 7 in which platinum is loaded on the layered porous silica, $NO_x$ can be purified at higher ratio and at lower temperature than that of the catalyst in the Comparative Example 1 in which platinum is loaded on δ-alumina.

TABLE 4

| Catalysts | HC Concentration | Maximum $NO_x$ Purification Ratio | Maximum Temperature for Purifying $NO_x$ |
|---|---|---|---|
| Embodiment 2 | 500 ppm | 14.6% | (240° C.) |
|  | 1000 ppm | 29.4% | (220° C.) |
|  | 3000 ppm | 50.0% | (220° C.) |
|  | 5000 ppm | 49.6% | (200° C.) |
| Embodiment 7 | 500 ppm | 20.0% | (220° C.) |
|  | 1000 ppm | 31.2% | (220° C.) |
|  | 3000 ppm | 46.0% | (240° C.) |
|  | 5000 ppm | 49.2% | (220° C.) |
| Comparative | 500 ppm | 17.1% | (240° C.) |

TABLE 4-continued

| Catalysts | HC Concentration | Maximum NO$_x$ Purification Ratio | Maximum Temperature for Purifying NO$_x$ |
|---|---|---|---|
| Example 1 | 1000 ppm | 34.0% | (240° C.) |
|  | 3000 ppm | 42.6% | (240° C.) |
|  | 5000 ppm | 40.5% | (240° C.) |

Concerning the catalysts in the Preferred Embodiments 2, 7 and the Comparative Example 1, the ability for purifying NO$_x$ was evaluated about the model gas which corresponds to the gas having the air fuel ratio of 18 and which is suitable for exhaust gas in lean-burn engines. Each catalyst is formed into the granule having 0.3 to 0.7 mm, and it is filled with a reaction vessel made of quarts. Then, the ability for purifying NO$_x$ is evaluated by measuring the concentration of outflow gas and inflow gas. The space velocity is about 33000 h$^{-1}$.

Table 5 shows NO$_x$ purification ratio at the early stage of each catalyst, and NO$_x$ purification ratio after five-hour treatment in the model gas which corresponds to the gas having the air fuel ratio of 18 and which includes 10% of aqueous vapor at the temperature of 700° C. and 800° C.

TABLE 5

| Catalysts | Maximum NO$_x$ Purification Ratio Early Stage | Maximum Temperature for Purifying NO$_x$ 700° C. × 5 hr | 800° C. × 5 hr |
|---|---|---|---|
| Embodiment 2 | 24 (230° C.) | 24 (250° C.) | 23 (250° C.) |
| Embodiment 7 | 30 (220° C.) | 28 (250° C.) | 25 (250° C.) |
| Com. Ex. 1 | 23 (230° C.) |  | 22 (240° C.) |

The catalysts in the Preferred Embodiments 2 and 7 in which platinum is loaded on the layered porous silica have higher NO$_x$ purification ratio and more excellent heat resistance than that of the catalyst in the Comparative Example 1 in which platinum is loaded on δ-alumina.

Eighth Preferred Embodiment

By using the layered porous silica which was synthesized from kanemite, various kinds of HC components in the exhaust gases of the engine were absorbed and the rates of absorbing each of HC components were measured. For the comparison, the same measurement was conducted on zeolite (ZSM-5). The result is shown in FIG. 6.

The above-mentioned measurement was conducted under the following conditions: after the engine was started, exhaust gas was introduced into the converter for one minute under the condition in which engine rotational speed is 1200 rpm and the first idle condition in which negative pressure is 250 mmHg. Inside the converter, absorbents of above-mentioned layered porous silica or zeolites are filled.

Figure 6:
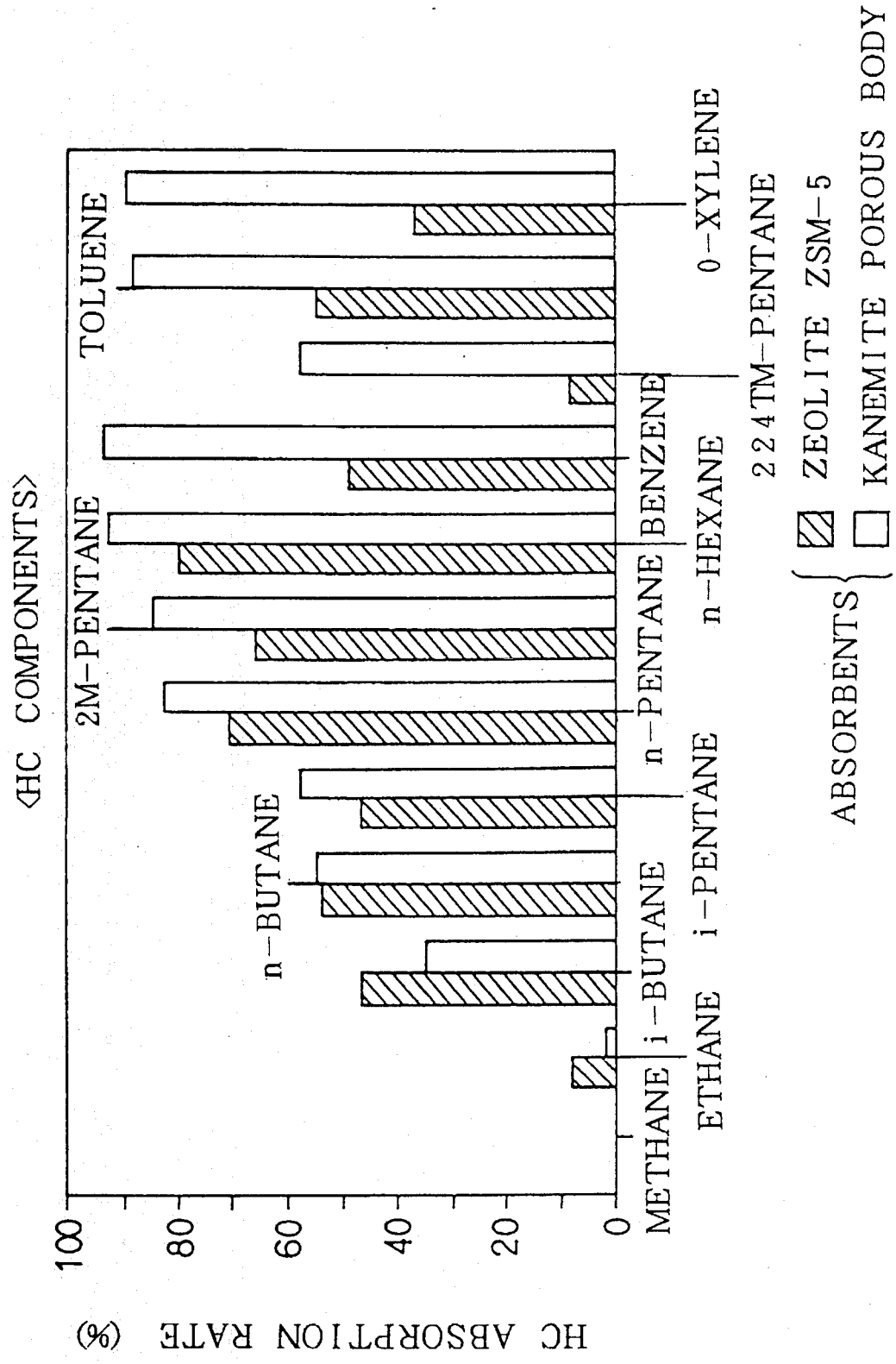
FIG. 6 is a graph comparing the ratios of absorbing each of HC components included in the engine exhaust gases in the Fifth Preferred Embodiment.
Figure 7:
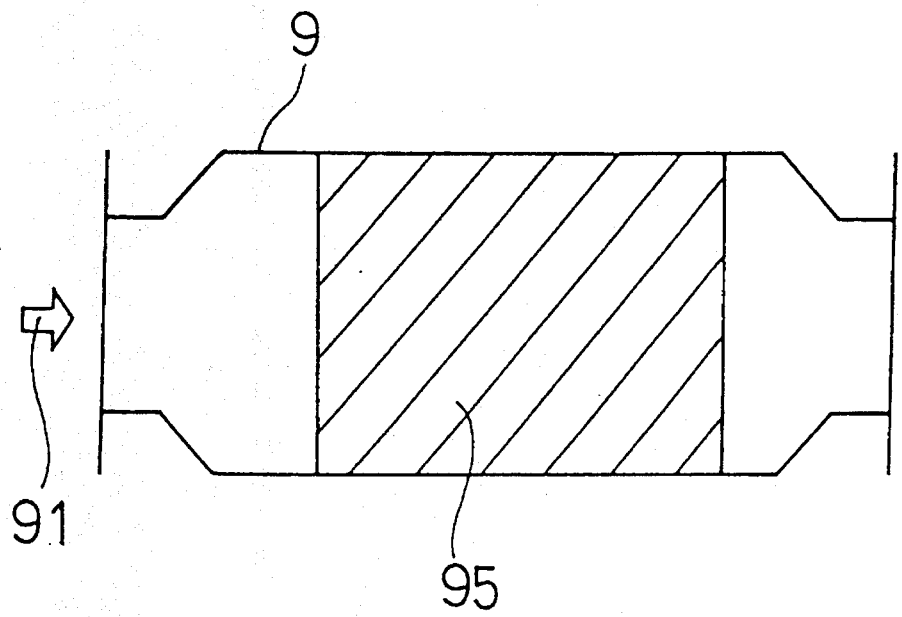
FIG. 7 is a layout drawing of layered porous silica in the converter in the reference example of the Sixth Preferred Embodiment.

In FIG. 6, HC absorbing rates show the absorbing percentage of HC components (100%), which are included in the above-mentioned exhaust gas, by the above-mentioned absorbents. The axis of abscissa in FIG. 7 shows the HC components such as methane, ethane, toluene and O-xylene, which are included in the above-mentioned exhaust gases.

As shown in FIG. 6, excluding the part of HC whose molecular weight is relatively low such as ethane and isobutane, HC components whose molecular weight is relatively high such as isopentane, benzene, toluene and O-xylene show higher absorbing rate in the above-mentioned layered porous silica.

Also as shown in FIG. 6, the above-mentioned layered porous silica has larger absorbing capacity especially concerning HC whose carbon atom number is more than 6 and bulky aromatic hydrocarbon.

Table 6 shows each of physical properties such as specific surface pore (m$^2$/g), pore diameter (nm) and pore capacity (cc/g) of the above-mentioned layered porous silica and zeolite (ZSM-5) in the Fifth Preferred Embodiment. As is shown in Table 3, the specific surface of layered porous silica is larger than that of zeolite and pore diameter and pore capacity of layered porous silica are also larger than those of zeolite.

TABLE 6

Comparisons of Physical Properties

|  | layered porous silica | zeolite (ZSM-5) |
|---|---|---|
| specific surface (m$^2$/g) | 831 | 420 |
| pore diameter (nm) | 1.9 | 0.7 |
| pore capacity (cc/g) | 0.78 | 0.45 |

Figure 8:
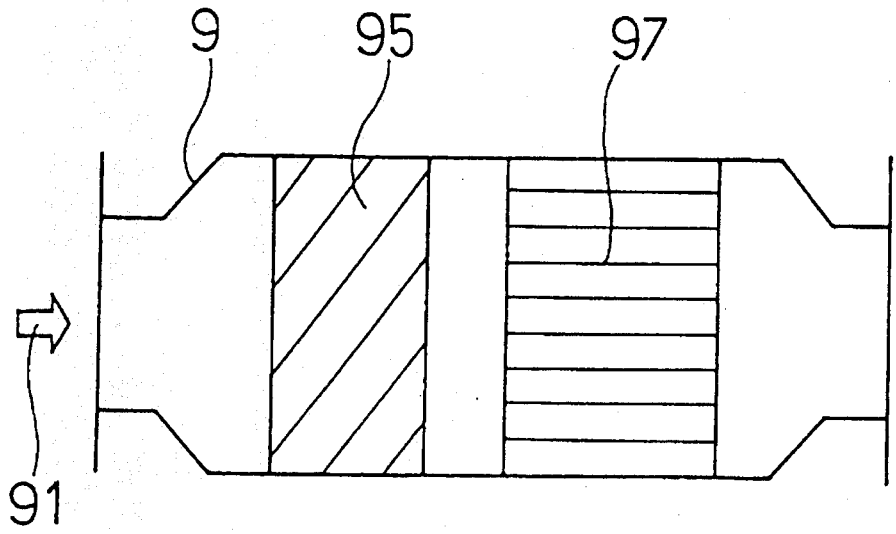
FIG. 8 is a layout drawing of layered porous silica and the catalyst in the converter in the Sixth Preferred Embodiment.
Figure 9:
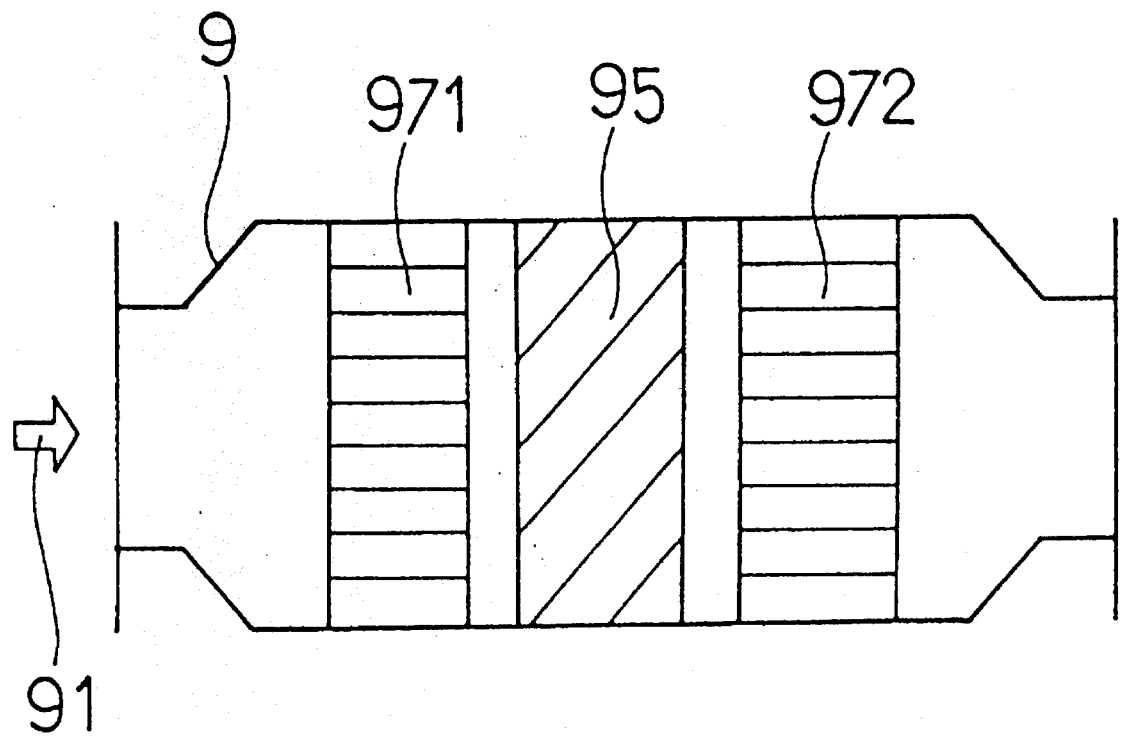
FIG. 9 is a layout drawing of layered porous silica and the catalyst in the converter in the Sixth Preferred Embodiment.

FIGS. 7 to 9 show the arrangements of layered porous silica (the same arrangement is applied to layered porous silica-metal oxide and the followings are also applied to it) in the converter for purifying exhaust gas.

FIG. 7 shows the referential example in which only the above-mentioned layered porous silica 95 is filled in the converter 8 to trap HC in the exhaust gas 91.

FIG. 8 shows the embodiment in which the layered porous silica 95 is provided at the upstream side of the converter 9 and three way catalyst 97 is provided at the downstream side of the converter 9. In this case, at the time of cold starting of the engine, HC components are absorbed by the layered porous silica 95 and when the temperature of the exhaust gas rises (the time of warming up) this HC can be purged and purified by the three way catalyst 97.

FIG. 9 shows the embodiment in which the layered porous silica 95 is disposed at the middle portion in the converter 9 and the first catalyst 971 is disposed at the upstream side of the converter 9 and the second catalyst 972 is disposed at the downstream side of it.

In this case, the first catalyst 971 is warmed up earlier compared with the second catalyst 972, so the initial purifying rate of HC is high and the burden of absorbing by the layered porous silica 95 can be reduced.

Having now fully described the invention, it will be apparent to one of ordinary skill in the art that many changes and modifications can be made thereto without departing from the spirit or scope of the invention as set forth herein.

What is claimed is:

1. An exhaust gas purifying catalyst comprising a support of a layered porous silica or a layered porous silica-metal oxide that comprises a plurality of layered silica sheets, the sheets being curved and partially connected to each other by silicon atoms that constitute the sheets through an oxygen atom, thus forming Si—O—Si bonds to form a three-dimensional structure having a plurality of pores in the diameter range of from 10 to 60 Angstroms, having a surface area in the range of from 4,400 to 4,500 $m^2/g$ and having at least one catalyst metal selected from the group consisting of noble metals, transition metals and rare earth metals, wherein said catalyst metal is loaded on said support.

2. An exhaust gas purifying catalyst according to claim 1, wherein said layered porous silica has an interlayered bridge of $SiO_2$ which is formed by condensation of silanols among layered crystals of $SiO_4$ tetrahedra, and a large number of pores which are provided among layers.

3. An exhaust gas purifying catalyst according to claim 1, wherein said layered porous silica-metal oxide has an interlayered bridge of $SiO_2$ which is formed by condensation of silanols among layered crystals of $SiO_4$ tetrahedra, a large number of pores which are provided among layers, and acidity which is generated by connecting said layered porous silica with metallic atoms other than silicon.

4. An exhaust gas purifying catalyst according to claim 1, wherein a majority of said pores have a diameter of between about 20 and about 35 Angstroms.

* * * * *

UNITED STATES PATENT AND TRADEMARK OFFICE
CERTIFICATE OF CORRECTION

PATENT NO. : 5,462,905
DATED : October 31, 1995
INVENTOR(S) : Tetsuo NAGAMI et al.

It is certified that error appears in the above-indentified patent and that said Letters Patent is hereby corrected as shown below:

Cover page, item [73], change "Toyota Chuo Kenkyusho Kabushiki kaisha" to --Kabushiki Kaisha Toyota Chuo Kenkyusho--.

Signed and Sealed this

Ninth Day of April, 1996

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,462,905
DATED : October 31, 1995
INVENTOR(S) : Tetsuo NAGAMI et al.

It is certified that error appears in the above-indentified patent and that said Letters Patent is hereby corrected as shown below:

At column 13, line 1, change "4,400 to 4,500" to
--1,100 to 1,500--.

Signed and Sealed this

Eleventh Day of June, 1996

Attest:

BRUCE LEHMAN

Attesting Officer     Commissioner of Patents and Trademarks